United States Patent [19]
Chi et al.

[11] Patent Number: 5,940,870
[45] Date of Patent: Aug. 17, 1999

US005940870A

[54] ADDRESS TRANSLATION FOR SHARED-MEMORY MULTIPROCESSOR CLUSTERING

[75] Inventors: Hsin-Chou Chi, Tainan; Yeong-Chang Maa, Kaohsiung; Cheng-Sheng Chan, Hsin-Chu, all of Taiwan

[73] Assignee: Industrial Technology Research Institute, Taiwan

[21] Appl. No.: 08/651,150

[22] Filed: May 21, 1996

[51] Int. Cl.[6] ..................................................... G06F 9/06
[52] U.S. Cl. ........................ 711/206; 711/203; 711/173; 709/216; 712/800.28
[58] Field of Search .................................... 711/206, 209, 711/148, 153, 202, 147, 152, 170, 173, 203; 709/213, 214, 215, 216; 712/800.14, 800.28

[56] References Cited

U.S. PATENT DOCUMENTS

| | | | |
|---|---|---|---|
| 4,754,394 | 6/1988 | Brantley et al. | 711/5 |
| 4,951,193 | 8/1990 | Muramatsu et al. | 711/206 |
| 4,980,822 | 12/1990 | Brantley et al. | 711/202 |
| 5,197,130 | 3/1993 | Chen et al. | 711/148 |
| 5,230,045 | 7/1993 | Sindhu | 711/203 |
| 5,237,673 | 8/1993 | Orbits et al. | 711/148 |
| 5,247,629 | 9/1993 | Casamatta et al. | 711/206 |
| 5,274,789 | 12/1993 | Costa et al. | 711/206 |
| 5,297,265 | 3/1994 | Frank et al. | 711/202 |
| 5,394,555 | 2/1995 | Hunter et al. | 711/148 |
| 5,566,321 | 10/1996 | Pase et al. | 711/153 |
| 5,590,301 | 12/1996 | Guenthner et al. | 711/209 |
| 5,613,071 | 3/1997 | Rankin et al. | 711/147 |
| 5,617,537 | 4/1997 | Yamada et al. | 395/200.44 |
| 5,682,512 | 10/1997 | Tetrick et al. | 711/202 |
| 5,710,907 | 1/1998 | Hagersten et al. | 711/148 |
| 5,778,429 | 7/1998 | Sukewaga et al. | 711/153 |
| 5,784,706 | 7/1998 | Oberlin et al. | 711/202 |

OTHER PUBLICATIONS

Anderson et al. A Case for Networks of Workstations: NOW. IEEE Micro, Feb. 1995. [Online] http://now.cs.berkeley.edu/Papers2/index.html, Feb. 1995.

Blumrich et al. Virtual memory mapped network interface for the SHRIMP multicomputer. In Proc. 21–th International Symposium on Comp. Arch., pp. 142–153, Chicago, IL, Apr. 1994. [Online] http://www.acm.org/pubs/citations/proceedings/isca/191995/p142–b.

Hwang et al. Scalable Parallel Computers for Real–timeSignal Processing. IEEE Signal Processing, pp. 50–66 Jul. 1996.

Becker et al. Beowulf:A Parallel Workstation for Scientific Computation. Proceedings of the 1995 International Conference on Parallel Processing(ICPP) vol. 1, pp. 11–14 [Online] http://beowulf.gsfc.nasa.gov/papers/papers.html, Aug. 1995.

Primary Examiner—John W. Cabeca
Assistant Examiner—Yamir Encarnacion
Attorney, Agent, or Firm—Fish & Richardson P.C.

[57] ABSTRACT

An address translation method for use in a system including a plurality of cluster nodes and including the steps of: at a source node, receiving over a first network a communication with a first destination address having an index portion and an offset portion, wherein the index portion includes a partition number portion; providing an address mapping table which maps a plurality of indexes to a corresponding plurality of node ID's, each of the plurality of node ID's identifying a different one of the plurality of cluster nodes; using the index portion from the first destination address as an index into the address mapping table to identify a node ID, wherein the identified node ID identifies a destination node; appending the identified node ID to the first destination address to generate a second destination address; and using the second destination address to send information to a second network of the destination node.

20 Claims, 5 Drawing Sheets

ADDRESS TRANSLATION FOR SHARED-MEMORY MULTIPROCESSOR CLUSTERING

This application relates to Republic of China patent 297977, issued on Feb. 11, 1997.

BACKGROUND OF THE INVENTION

The invention relates generally to distributed, shared-memory multiprocessor systems.

Many multiprocessor systems employ a shared bus to connect multiple processors, memory modules, and I/O devices. Such multiprocessors are usually called symmetric multiprocessors (SMP) since the latency for any processor accessing any portion of memory is uniform. An SMP system usually equips each processor with a cache and provides a snoopy cache coherence protocol to reduce the traffic on the bus. It has been shown that the shared bus is a cost-effective interconnect for attaching more processors owing to simplicity of the SMP architecture. See, for example, W. K. Dawson et al., "A Framework for Computer Design," IEEE Spectrum, pp. 49–54, October 1986; and D. B. Gustavson, "Computer Buses—A Tutorial," IEEE Micro, pp. 7–22, August 1984.

Although the shared bus architecture is simple and effective, the system's performance does not scale well. As the number of processors increases beyond a certain point, the shared bus, due to is limited bandwidth, becomes the major performance bottleneck. Furthermore, given the speed at which processor technology is rapidly progressing, it will be even more difficult in the future for shared bus architectures to provide adequate bandwidth in a multiprocessor system.

Lately, scalable networks have been proposed as an interconnect for multiprocessor systems. Scalable networks, such as rings, meshes, and trees, provide a multiprocessor system with higher bandwidth as the number of processors increases. With scalable networks, a large-scale parallel machine can be built for a number of nodes. Each node can be either a single-processor system or an SMP system.

FIG. 1 shows an example of a scalable multiprocessor system based on the ring network. In general, each node 10 on the ring network 12 includes a CPU 14 with cache memory 16, local memory 18, and a local bus 20, over which CPU 14 can access local memory 18. The node is connected to the ring network 12 through an interface module 22.

For multiprocessors based on scalable networks, it is important to be able to run a wide variety of applications without excessive programming difficulty. A single address space greatly aids in the programmability of multiprocessors by reducing the problems of data partitioning and dynamic load distribution, two of the more difficult problems in programming parallel machines. The shared address space also provides better support for parallelizing compilers, standard operating systems, multiprogramming, and incremental tuning of parallel machines. For further details see D. Lenoski et al., "The DASH Prototype: Logic Overhead and Performance," IEEE Transactions on Parallel and Distributed Systems, pp. 41–61, January 1993.

In multiprocessor systems, it is feasible to physically partition the shared memory into several portions and distribute those portions among the nodes. These shared memory portions can be accessed by all the nodes in the system as described by D. Lenoski et al. in the above-identified reference and as further described by D. Kuck et al., in "Parallel Supercomputing Today and the Cedar Approach," Science, vol. 231, pp. 967–974, February 1986 and by G. Pfister, et al., in "The IBM Research Parallel Processor Prototype (RP3): Introduction and Architecture," International Conference on Parallel Processing, pp. 764–771, August 1985. Such systems are called distributed shared memory multiprocessors. The shared memory will also be called global memory interchangeably in the following. A cache coherence protocol can be included in distributed shared memory multiprocessors in order to improve the performance on shared memory access (see D. Lenoski, above).

Although many distributed shared memory multiprocessor systems can use off-the-shelf microprocessors directly, the interconnect is typically proprietary and cannot connect existing workstations (or personal computers) in a "pay-as-you-go" fashion. Alternatively, multiprocessor clustering has been proposed as an approach to constructing scalable multiprocessors efficiently. With multiprocessor clustering, commodity workstations or personal computers can be grouped together to form a distributed shared memory machine.

As noted above, the performance of multiprocessor systems with a shared bus is limited due to the bottleneck of the bus. Hence, to provide higher bandwidth in such systems, hierarchical buses have been proposed in many machines. See, for example, the above-referenced article by D. Kuck and also U.S. Pat. No. 5,237,673. FIG. 2 shows a representative shared memory multiprocessor system with hierarchical buses. In such systems, each local bus 30 connects its associated processors 32 and local memory 34. Separate shared memory 36 resides on a global bus 38, which can be accessed by the processors 32 on any local bus 30. Although hierarchical buses help improve the bandwidth of shared memory multiprocessors, they still do not scale very well since the global bus causes a performance bottleneck.

Many shared memory multiprocessors based on scalable networks have been proposed or implemented. In addition to the above-referenced articles by D. Leonski and G. Pfister, also refer to A. Gottlieb et al., "The NYU Ultracomputer—Designing an MIMD Shared Memory Parallel Computer," IEEE Transactions on Computers, pp. 175–189, February 1983; KSR, "KSR-1 Overview," Internal Report, Kendall Square Research Corporation, 1991; and U.S. Pat. No. 5,297,265. Some of these machines include a cache coherence protocol to improve its performance on accessing shared memory. However, these machine architectures are not open enough in the sense that their interconnects are proprietary designs, although they may use off-the-shelf processors. With proprietary architectures, the system cost is usually high due to the limited volume of sale. Alternatively, multiprocessor clustering has been proposed to overcome this problem by connecting a group of existing workstations. In a clustered shared memory multiprocessor system, each cluster node has one or more processors, and the global shared memory is partitioned and distributed among the nodes. With multiprocessor clustering, systems can be expanded in a "pay-as-you-go" fashion.

FIG. 3 shows the configuration of a typical cluster node. In such a cluster node, there can be more than one processor 42 (with its local cache memory) on a shared bus 40. There exist two types of memory on the bus: private memory 50 and global memory 52. The private memory 50 can only be accessed by the processors 42 in the local cluster node, while the global memory 52 can be accessed by any processor in the whole system. A memory control unit 43 controls accesses to private memory 50 and a cluster cache and directory 54, which is usually associated with each node, contains the line copies from remote clusters and keeps track of the states of the memory lines and the cache lines in the associated node. A cluster interface 56 is a controller which is in charge of translating transactions between the shared bus 40 and the intercluster networks. It also maintains cache coherence over the intercluster network. A routing switch 58 is used to transmit and receive transaction packets to and from other cluster nodes.

The major problem with the architecture in FIG. 3 is that the additional memory required for the global memory in the system increases the cost of clustering. A separate global memory in the cluster node makes memory utilization inefficient. As described below, a solution to this problem is to borrow a portion of the existing memory in the cluster node for the global memory.

SUMMARY OF THE INVENTION

In general, in one aspect, the invention is an address mapping configuration for use in distributed shared memory multiprocessor systems. The address space seen by any node consists of the local space and the global space. The local space consists of the private memory, which can be accessed exclusively by the corresponding node, and the near global memory which resides in the associated node but can be accessed by all the nodes. The global space is partitioned according to the number of nodes, with each address partition corresponding to a node. A node accesses its near global memory through the local space and the global memory on remote nodes through the global space.

In general, in another aspect, the invention is an address translation scheme from a source node to a destination node and its associated hardware support. The address translation mechanism is realized in a cluster interface. At the source node, the address on the bus consists of two parts: an AMT (Address Mapping Table) index and an Offset. The AMT index is used to index into the AMT table to retrieve the destination node ID. The AMT is a hardware table in the cluster interface, which is filled during initialization by the system. The global address of the interconnect is composed of the destination node ID and the source node bus address. At the destination node, the address is modified as follows. First the node ID is stripped off, and the partition number of the address from the packet header is changed to 0. Then the address is added by the starting address of the near global memory of the destination node.

Using the above-identified scheme, there is no need to modify the processor and the memory control circuitry in existing workstations or personal computers, and hence cost effectiveness is achieved. Also, the address translation scheme of the invention facilitates multiprocessor clustering and it facilitates efficient utilization of the existing memory in the cluster node. In addition, it makes it possible to connect existing computing nodes to form a distributed shared memory multiprocessor system.

The invention can be used in a variety of environments including clustered uniprocessor or multiprocessor platforms to support compatibility for software on existing workstations or personal computers, and clustered uniprocessor or multiprocessor platforms to support global shared memory for larger applications.

Other advantages and features will become apparent from the following description of the preferred embodiment and from the claims.

DESCRIPTION OF THE PREFERRED EMBODIMENTS

Figure 4:
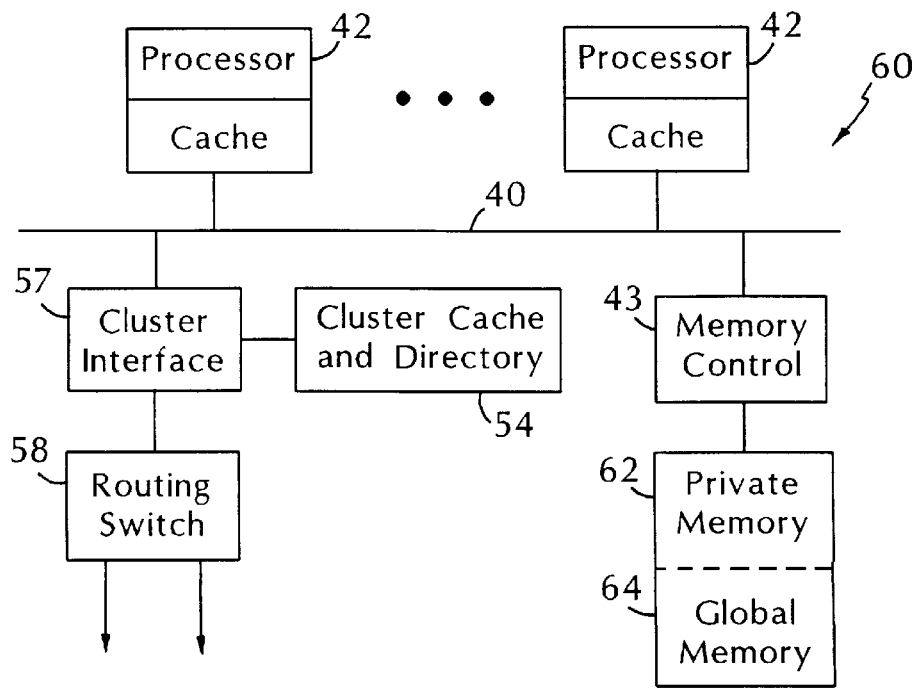
FIG. 4 is a block diagram of a cluster node for a multiprocessor system in which both private memory and global memory share the same existing physical memory.

An address translation scheme is proposed for clustering existing workstations or personal computers cost effectively. By clustering, a distributed shared memory multiprocessor is constructed. FIG. 4 shows the configuration of such a cluster node 60 in accordance with one aspect of the invention. Each node 60 has its own private memory 62 and contributes a portion of the global memory (identified in FIG. 4 as global memory 64). Thus, the global memory is partitioned and distributed among all the cluster nodes, while at the same time it can be accessed by processors in any node. In each cluster node 60, the global memory 64 is simply a portion of the existing physical memory. The boundary between the private memory 62 and the global memory 64 can be programmable.

Figure 1:
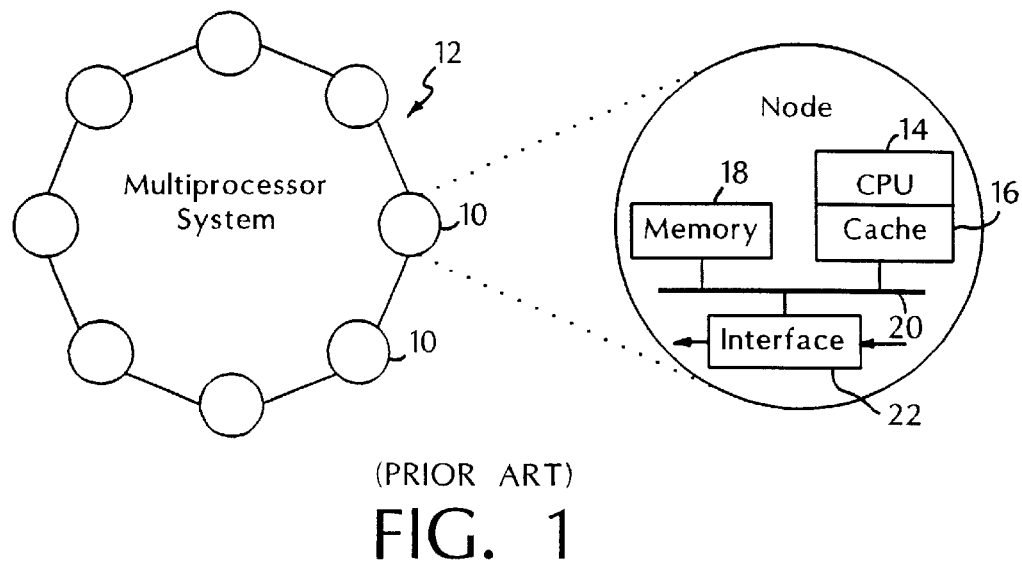
FIG. 1 shows a block diagram of a scalable multiprocessor system that is based on a ring network.
Figure 2:
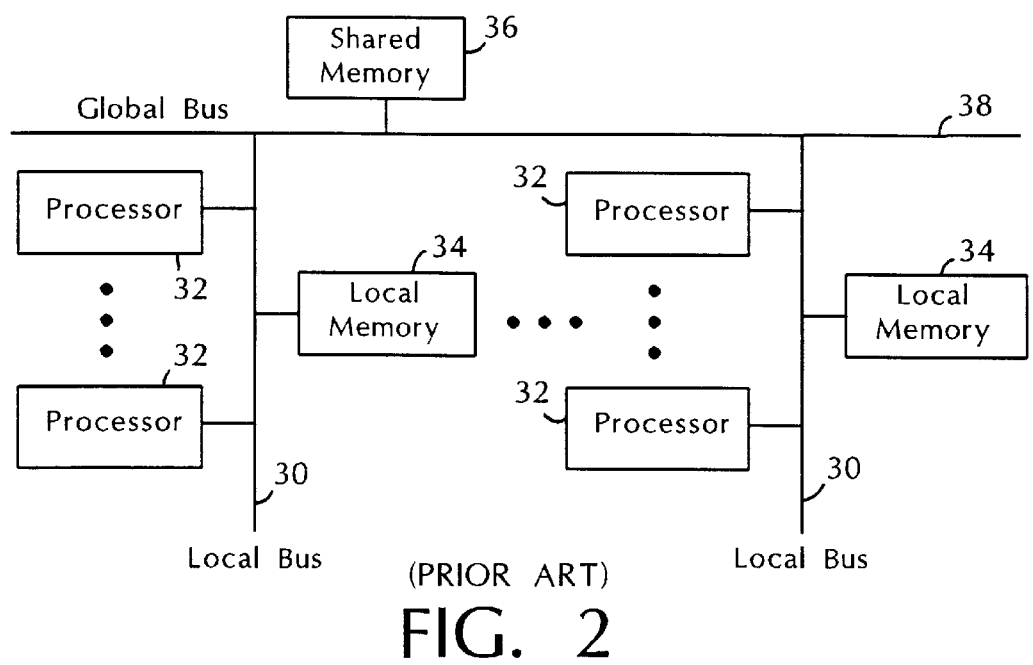
FIG. 2 shows a block diagram of a shared memory multiprocessor system with hierarchical buses.
Figure 3:
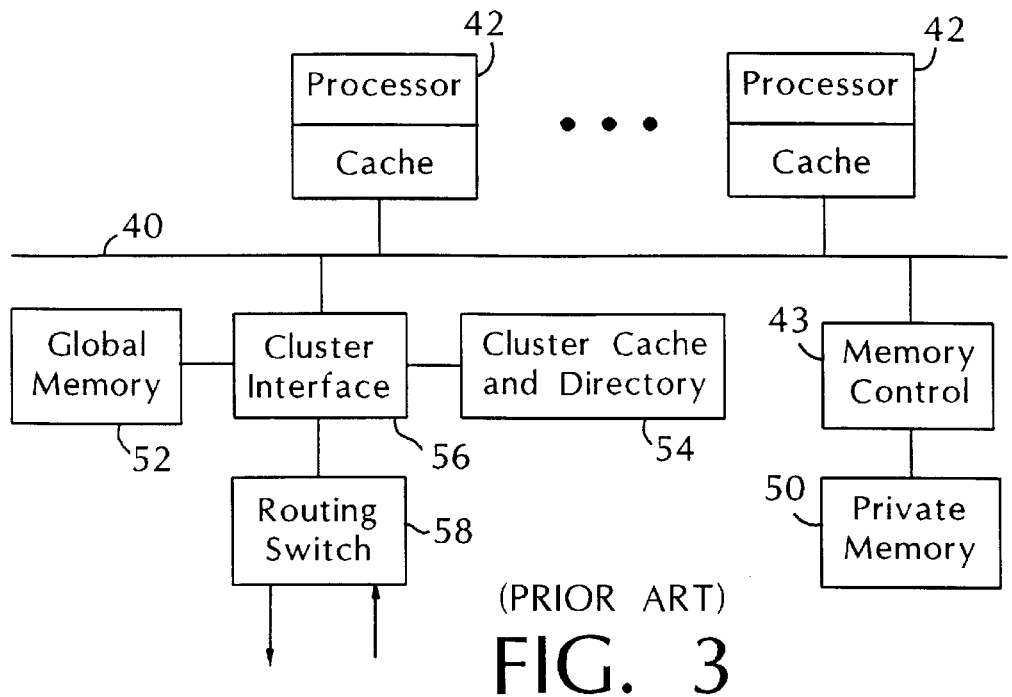
FIG. 3 is a block diagram of a typical cluster node for multiprocessor clustering.

Most of the other elements in FIG. 4 were described previously in connection with FIG. 3 and are identified by the same numbers. The cluster interface 57, however, is modified to includes other functionality relating to the division of local physical memory into private memory and global memory partitions.

Figure 5:
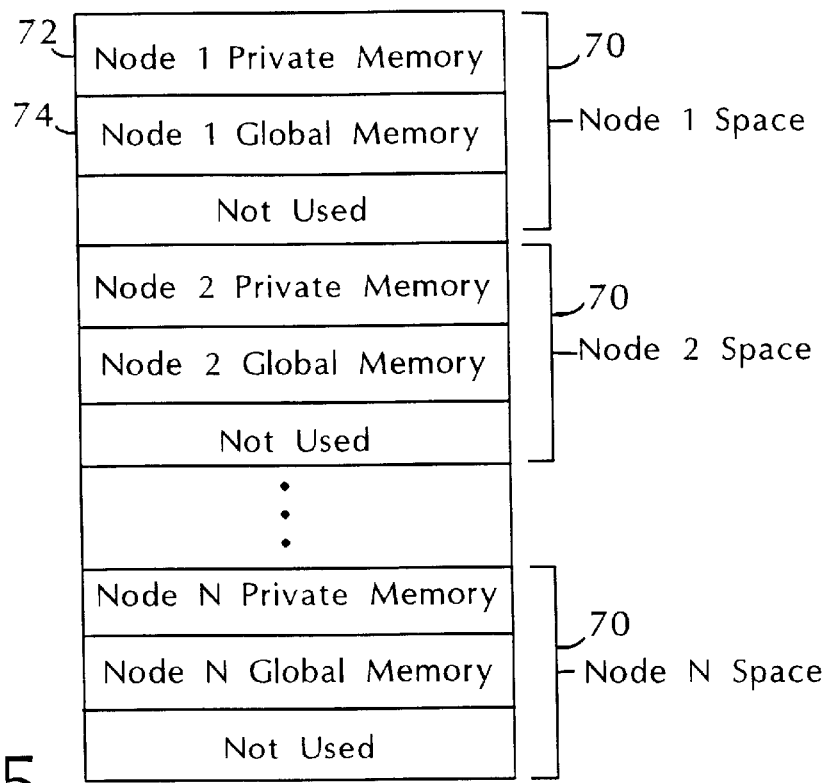
FIG. 5 shows a simple address mapping scheme for multiprocessor clustering.

A natural address mapping scheme is to simply divide the global address space into several partitions according to the number of the cluster nodes. The global address space is the address space seen on the bus of the cluster node. FIG. 5 shows such a scheme. Each address partition 70 is reserved for a cluster node. In the address space allocated for each node, there exists the associated private memory 72 and global memory 74. This simple address mapping scheme, however, wastes a lot of address space for the private memory which cannot be accessed by other nodes. The scheme also does not allow the private memory to be larger than the address space partition for a node. Furthermore, the private memory occupies a different region for different cluster nodes. Thus, this requires modifying existing commodity workstation or personal computer which are used as a cluster node.

Figure 6:
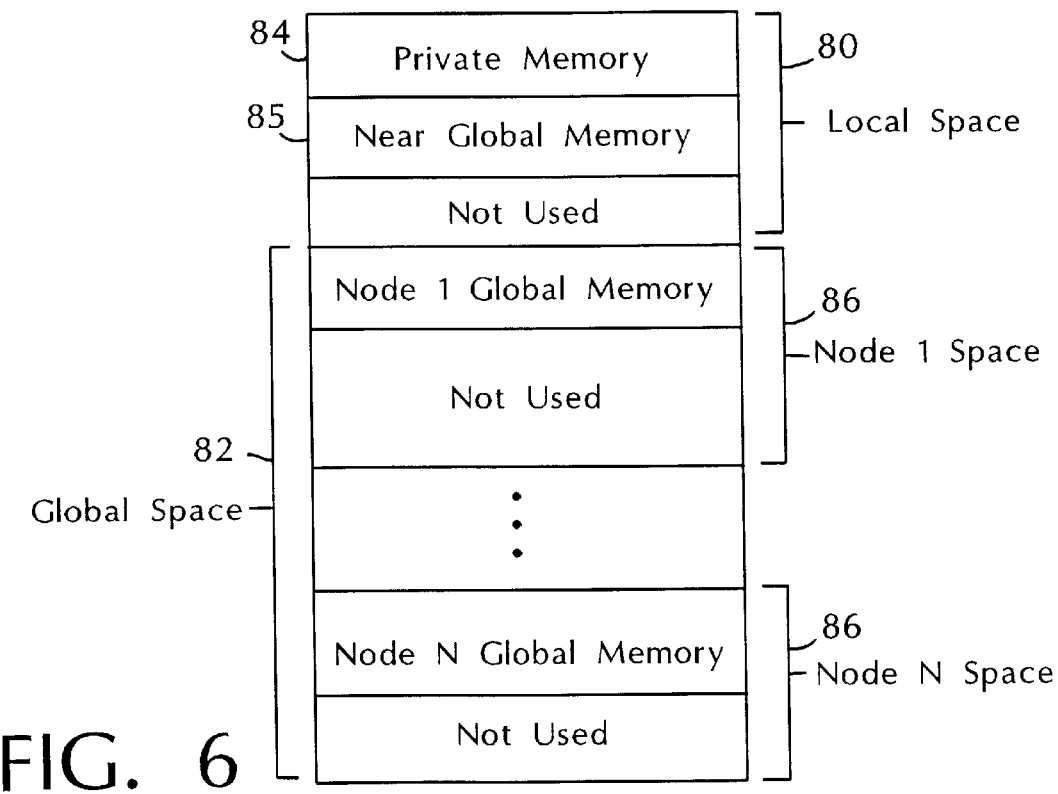
FIG. 6 shows an address space as seen by any node in a shared memory multiprocessor clustering system in accordance with the invention.

FIG. 6 shows the address partitioning seen by any node in a clustered multiprocessor system constructed in accordance with the present invention. The address space is specified by the address appearing on the bus in the cluster node. The address space consists of two regions: a local address space 80 and a global address space 82. Private memory 84 and near global memory 85 associated with the node reside in the local address space 80. The global address space is divided into several partitions 86. Each partition 86 corresponds to a cluster node. Through the partition of the global address space, a node can access the global memory of any remote node.

Figure 7:
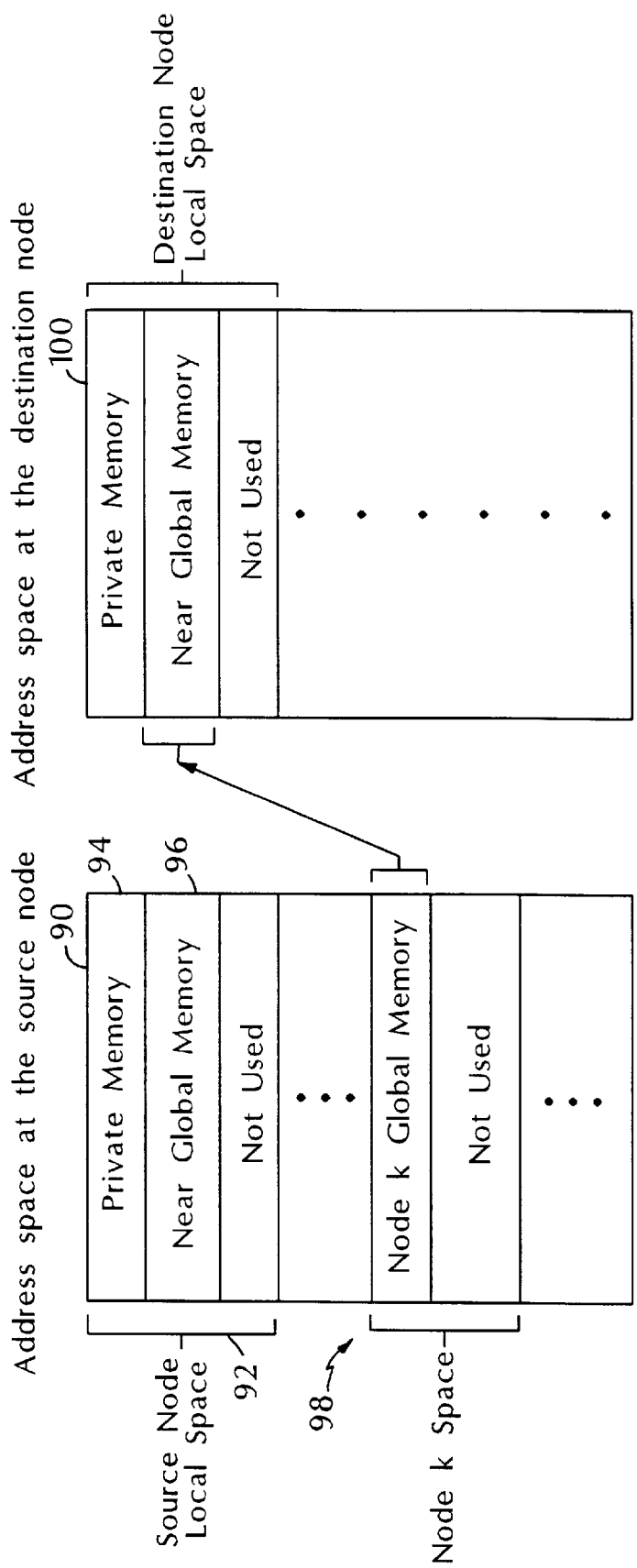
FIG. 7 illustrates the address mapping of a transaction from a source node to a destination node.

FIG. 7 illustrates the address mapping of a transaction from a source node to a destination node. Shown in the left is the address space 90 at the source node and one the right is the address space 100 at the destination node. When the address appearing on the processor bus in the source node is within the local space 92, the access is toward either the private memory 94 or near global memory 96. If the address is out of the local space 92, the access is toward the global memory 98 and may go out of the cluster node, if it is not located in the cluster cache.

Note that according to this address mapping configuration, it is possible for a node to access its near global memory by issuing an address which falls in the global space of its own partition. For example, referring again to FIG. 6, the node 1 global memory for node 1 is located within the near global memory address space of the local physical memory for that node. Thus, node 1 can access that portion of global memory either directly, by using addresses which fall within the appropriate region of its local memory space, or indirectly by using addresses which fall within the node 1 partition of global memory. In the first case, the cluster interface is not involved. In the latter case, the access goes through the local cluster interface. To avoid possible aliasing problems, this partition of the global address space is not used during normal operation. However, this address partition can be used for testing the cluster interface and the routing switch, since the access goes out of the node and comes back again from the interconnect.

Figure 8:
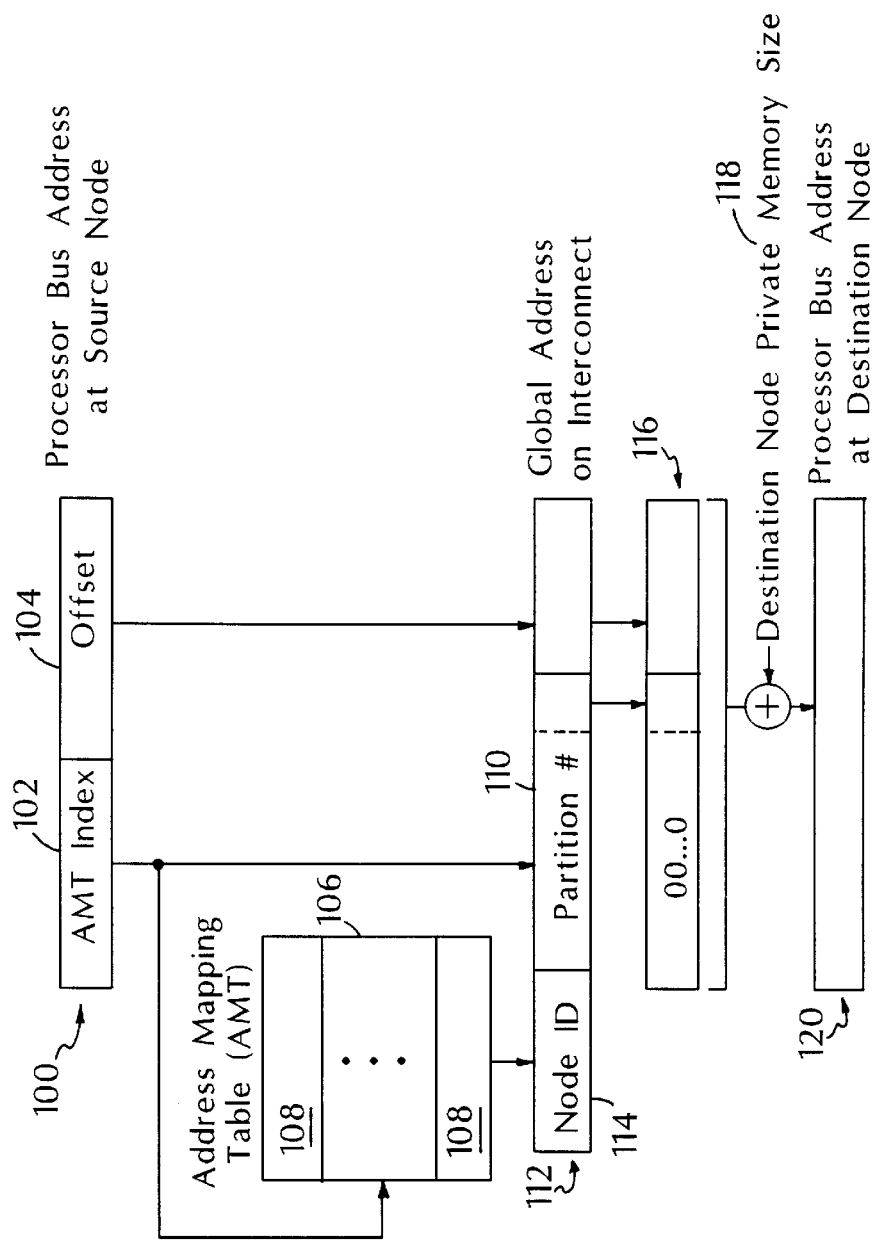
FIG. 8 shows address translation via an address mapping table.

FIG. 8 shows the address translation from the source node to the destination node. The processor bus address 100 at the source node consists of two parts: an AMT Index 102 and an Offset 104. The AMT Index 102 is used to retrieve an entry from an Address Mapping Table (AMT) 106. Each table entry 108 contains a destination node ID for an access request on the processor bus. The number of entries in the AMT 106 is not necessarily equal to the number of the address partitions. For instance, in one embodiment, the AMT has 64 entries and the number of address partitions is 16. In that case, the AMT Index 102 is 6 bits while only the most significant 4 bits of these 6 bits indicate the partition number 110. In the AMT 106, the four consecutive entries corresponding to a given partition number are filled with the same destination node. Note that the node ID from the AMT 106 is the physical node ID which is unique in the whole system. The partition number 110 is the logical node ID within each application, such that there may be more than one application running on the system.

It is also possible to employ a scheme which allocates the several entries of the AMT for all the address partitions, with each partition occupying only one entry. However, with this scheme the address space for each partition is fixed regardless of the number of partitions. Hence, this fixed partition scheme is less flexible compared to the scheme described in the above.

The global address 112 on the interconnect is composed of the node ID 114 and the processor bus address 110 at the source node. This global address is part of the header of the packet sent from the source node to the destination node. At the destination node, the node ID is stripped off and the partition number is replaced with 0, such that the translated address 116 falls in the local space of the destination node. Finally, the private memory size 118 at the destination node (or the starting address of the near global memory of the destination node) is further added to produce the processor bus address 120 to be used at the destination node.

Referring to FIG. 4, the cluster interface is a hardware circuit in charge of all the inter-node communication. It monitors the bus activity by an address window checking mechanism. The address window consists of several programmable registers which are used to specify the ranges of the private memory, the near global memory, and the global space in other nodes. When the bus transaction is targeted toward the private memory, the cluster interface simply ignores it. When the bus transaction is targeted toward the near global memory, the cluster interface checks with the directory 54 of the near global memory in order to maintain coherency. If the near global memory is not ready yet for the access, the cluster interface prohibits the access on the bus until the cluster interface performs the required inter-node transactions. When the bus transaction is targeted toward the remote global space and cannot be serviced by the cluster cache, the cluster interface generates inter-node transactions. For both near global memory access and remote global space access, the bus transaction inducing inter-node operation is completed either by a retry of the bus transaction from the transaction originator or by a deferred reply from the cluster interface.

To generate a transaction packet destined to another node in the system, the cluster interface retrieves the node ID from AMT 106 based on the AMT Index to form the global address, which is part of the packet header. Note that the AMT 106 is filled with the appropriate table entries at initialization when an application is to be run on the system. When a packet arrives at the destination node and it needs to access the near global memory through the bus, the cluster interface strips off the node ID of the global address and replaces the partition number with 0 (zero). Then the address is added to the size of the private memory (or the starting address of the near global memory) before the bus transaction is issued by the cluster interface. With such hardware support, the address translation scheme for multiprocessor clustering described above is efficiently realized.

Other embodiments are within the following claims.

What is claimed is:

1. A method of managing memory addressing in a system including a plurality of cluster nodes interconnected by a network, wherein each of the cluster nodes has an associated local physical memory that is accessible over an associated local network, said method comprising the steps of:

for each node, defining an address space that comprises a local address space and a global address space, wherein the local address space for each node maps to the local physical memory for that node;

at each cluster node, dividing the local address space into a private memory address space and a near global memory address space, wherein the private memory space of all of the cluster nodes is accessed exclusively by the cluster node with which that local physical memory is associated and wherein the near global memory space is accessible by all cluster nodes among said plurality of cluster nodes;

partitioning the global address space into a plurality of global memory address space partitions; and mapping the plurality of partitions to the near global memory address spaces of the cluster nodes so that each partition is mapped to the near global memory address space of a different one of said plurality of cluster nodes.

2. The method of claim 1 wherein the plurality of partitions is equal in number to the plurality of cluster nodes.

3. The method of claim 1 further comprising:

in any one of said plurality of cluster nodes, in response to detecting a communication with a destination address that falls within the global address space, determining which node stores the partition of global memory containing that destination address; and directing the communication to the node which stores the partition of global memory containing that destination address.

4. An address translation method for use in a system including a plurality of cluster nodes, the system having a global address space shared by different cluster nodes, said method comprising the steps of:

at a source node, receiving over a first network a communication with a first destination address in the global address space having an index portion and an offset portion, said source node being one of said plurality of cluster nodes and said index portion including a partition number portion that identifies a partition of global memory residing on a cluster node;

providing an address mapping table which maps a plurality of indexes to a corresponding plurality of node ID's, each of said plurality of node ID's identifying a different one of said plurality of cluster nodes;

using the index portion from the first destination address as an index into the address mapping table to identify a node ID, wherein the identified node ID identifies a destination node, said destination node being one of said plurality of cluster nodes and having physical memory containing a near global memory space defined therein;

appending the identified node ID to the first destination address to generate a second destination address; and using the second destination address to send information to a second network of the destination node.

5. The method of claim 4 wherein the plurality of indexes is equal in number than the plurality of node ID's so that the address mapping table contains a one-to-one mapping of indexes to node ID's.

6. The method of claim 4 wherein the plurality of indexes is greater in number than the plurality of node ID's so that for each of at least some of the plurality of node ID's multiple of said plurality of indexes are mapped to that node ID.

7. The method of claim 4 wherein the partition number portion is less than the index portion.

8. The method of claims 4, 5, 6, or 7 further comprising the steps of:

at the destination node, removing the node ID from the second destination address;

setting the partition number portion in the second destination address equal to a preselected number to produce a first address; and using the first address to access the near global memory space at the destination node.

9. The method of claim 8 further comprising the steps of:

adding a predetermined address to the first address to produce a second address; and using the second address to access the near global memory space at the destination node.

10. The method of claim 9 wherein the predetermined address is a starting address for near global memory address space within a local physical memory.

11. The method of claim 8 wherein the preselected number is zero.

12. An address translation method for use in a system including a plurality of cluster nodes, the system having a global address space shared by different cluster nodes, said method comprising the steps of:

at a destination node, receiving from a source node a communication which includes a destination address in the global address space containing a node ID, an index portion, and an offset portion, the index portion having a partition number portion that identifies a partition of global memory residing on a cluster node, said destination node and source nodes being members of said plurality of cluster nodes and having physical memory containing a near global memory space defined therein;

removing the node ID from the destination address;

setting the partition number portion in the destination address equal to a preselected number to produce a first address; and using the first address to access the near global memory space at the destination node.

13. The method of claim 12 wherein the preselected number is zero.

14. The method of claim 12 wherein the plurality of indexes is equal in number than the plurality of node ID's so that the address mapping table contains a one-to-one mapping of indexes to node ID's.

15. The method of claim 12 wherein the plurality of indexes is greater in number than the plurality of node ID's so that for each of at least some of the plurality of node ID's multiple of said plurality of indexes are mapped to that node ID.

16. The method of claim 12 wherein the partition number portion is less than the index portion.

17. The method of claims 12, 13, 14, 15, or 16 further comprising the steps of:

adding a predetermined address to the first address to produce a second address; and using the second address to access the near global memory space at the destination node.

18. The method of claim 17 wherein the predetermined address is a starting address for near global memory address space within a local physical memory.

19. A cluster interface for use in a system including a plurality of cluster nodes which are connected by a main network, the system having a global address space shared by different cluster nodes, said cluster interface comprising:

first means for receiving over a local network a communication having a first destination address in the global address space, said first destination address including an index portion and an offset portion;

an address mapping table which maps a plurality of indexes to a corresponding plurality of destination node ID's, wherein each destination node ID identifies a different one of the cluster nodes among said plurality of cluster nodes;

second means for converting the first destination address to a second destination address, said second means generating the second destination address by appending an identified destination node ID from the address mapping table to said first destination address; and third means for sending the communication over a second network using the second destination address.

20. A cluster interface for use in a cluster node which is connected by a main network to a plurality of other cluster nodes and which is connected to a local memory that is partitioned into local memory space and a near global memory space, the cluster nodes sharing a global address space, said cluster interface comprising:

means for receiving from a source node a communication which includes a destination address in the global address space containing a node ID, an index portion, and an offset portion, the index number portion having a partition number portion that identifies a partition of global memory residing on a cluster node, said destination node and source nodes being members of said plurality of cluster nodes;

means for removing the node ID from the destination address;

means for setting the partition number portion in the destination address equal to a preselected number to produce a first address; and means for using the first address to access the near global memory space.

* * * * *